(12) United States Patent
Chang

(10) Patent No.: US 9,764,396 B2
(45) Date of Patent: Sep. 19, 2017

(54) DISPOSABLE MULTI-EDGE CARVING BLADE

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 292 days.

(21) Appl. No.: 14/165,799

(22) Filed: Jan. 28, 2014

(65) Prior Publication Data

US 2015/0209866 A1  Jul. 30, 2015

(51) Int. Cl.
| | | |
|---|---|---|
| B23B 51/10 | (2006.01) | |
| B23C 5/10 | (2006.01) | |
| B23C 5/20 | (2006.01) | |
| B44B 3/06 | (2006.01) | |

(52) U.S. Cl.
CPC .............. *B23C 5/109* (2013.01); *B23C 5/207* (2013.01); *B44B 3/061* (2013.01); *B23C 2200/125* (2013.01); *Y10T 407/235* (2015.01)

(58) Field of Classification Search
CPC ... B23C 2200/125; B23C 5/109; B23C 5/207; B23B 51/101; B23B 51/102; B23B 51/103; B23B 51/105; B23B 51/10; B23B 51/0081
See application file for complete search history.

(56) References Cited

U.S. PATENT DOCUMENTS

| | | | | |
|---|---|---|---|---|
| 2,188,624 | A * | 1/1940 | Dantry ..................... | B23B 5/167 |
| | | | | 408/211 |
| 5,669,744 | A * | 9/1997 | Hines ....................... | B23C 5/10 |
| | | | | 144/136.95 |
| 6,220,795 | B1 * | 4/2001 | Matthews ............. | B23B 27/145 |
| | | | | 407/113 |
| 6,579,043 | B2 * | 6/2003 | Erickson ............... | B23B 27/065 |
| | | | | 407/35 |
| 7,445,410 | B2 * | 11/2008 | Abramson ............ | B23B 51/101 |
| | | | | 407/103 |
| 7,540,696 | B1 * | 6/2009 | Houle ................. | B23B 51/0063 |
| | | | | 408/211 |
| 2003/0059263 | A1 * | 3/2003 | Chen ........................ | B23C 5/10 |
| | | | | 407/54 |
| 2004/0001741 | A1 * | 1/2004 | Mast ....................... | B23B 51/00 |
| | | | | 408/233 |
| 2006/0029474 | A1 * | 2/2006 | Chang ................. | B23B 51/0063 |
| | | | | 407/48 |
| 2009/0041554 | A1 * | 2/2009 | Liu ....................... | B23B 51/101 |
| | | | | 408/225 |
| 2014/0199128 | A1 * | 7/2014 | Hecht ..................... | B23B 27/04 |
| | | | | 407/103 |

(Continued)

*Primary Examiner* — Sara Addisu
(74) *Attorney, Agent, or Firm* — Rosenberg, Klein & Lee

(57) ABSTRACT

A disposable multi-edge carving blade contains a first end and a second end which are symmetrical to each other and are connected together so as to form a V-shaped end portion of the carving blade, wherein the first end of the carving blade has a first side face defined thereon, and the second end of the carving blade has a second side face formed thereon, the carving blade also includes two chip removing grooves correspondingly arranged beside a distal end of the V-shaped end portion thereof, and each chip removing groove has a cutting face defined on a bottom end thereof and intersecting with a rotation axis of the carving blade so that at least two cutting edges are oppositely defined beside the rotation axis.

3 Claims, 8 Drawing Sheets

(56) References Cited

U.S. PATENT DOCUMENTS

2015/0196961 A1* 7/2015 Segev .................. B23B 51/048
                                                    408/201
2016/0107245 A1* 4/2016 Chang .................. B23B 51/105
                                                    408/226

* cited by examiner

US 9,764,396 B2

DISPOSABLE MULTI-EDGE CARVING BLADE

FIELD OF THE INVENTION

The present invention relates to a disposable carving blade, and more particularly to a disposable multi-edge carving blade which eliminates chips of workpiece quickly.

BACKGROUND OF THE INVENTION

A conventional carving tool is employed to cut or carve characters or patterns. As shown in FIGS. 6 to 8, a carving tool 30 is made of carbide material and contains an arbor 31 and a carving blade 32, wherein the carving blade 32 is comprised of a defining angle and a cutting edge 324. The defining angle is defined by a flat top face 321, a first side 322, and a second side 323. The cutting edge 324 is defined on a distal end of the carving blade 32 and is at more than 5 degrees relative to a plane. FIG. 8 is an amplified plan view of a part of a conventional carving blade. A first central line 320 of the carving blade 32 and a second central line 310 of the arbor have an eccentricity value e, a distance between an end of the cutting edge 324 and the second central line 310 is a width radius Y, a cutting width of the carving tool is 2Y. Since a cutting capacity of the carving tool 30 depends on the eccentricity value e of the carving blade 32, so that only the first side 322 and the cutting edge 324 are capable of cutting workpiece. Accordingly, the carving tool 30 can only cut the workpiece by ways of the first side 322 and the cutting edge 324, thus having lower cutting efficiency and eliminating chips of the workpiece slowly. In general, the carving tool 30 merely used to cut or carve characters or patterns less than 0.3 mm of width.

Referring further to FIG. 9, a disposable carving tool 40 contains a holding seat 42 arranged on a distal end of an arbor 41, wherein a threaded orifice 421 of the holding seat 42 and a central line 400 of the arbor have a minor eccentricity value e. The holding seat 42 is locked with a carving blade 50 in a rhombus shape, wherein the carving blade 50 has a first cutting rim 51 formed on a first end thereof and a second cutting rim 52 arranged on a second end thereof, the first end and the second end of the carving blade 50 are connected together so as to form a V-shaped end portion of the carving blade 50. The first cutting rim 51 is symmetrical to the second cutting rim 52, and an intersecting point of the first cutting rim 51 and the second cutting rim 52 is located at a central line 500 of the carving blade 50, a stepped hole 54 of the carving blade 50 is located at a central position of the carving blade 50, such that when the carving blade 50 is locked on the holding seat 42, a width radius between a tip of cutting edge 53 and the central line 400 of the arbor is Y, and a workpiece can only be cut by the first cutting rim 51 and the cutting edge 53, thus eliminating chips of the workpiece inefficiently. Although the cutting speed can be accelerated by an increase of rotation speed, the carving blade 50 is generally served to cut or carve characters or patterns less than 0.3 mm of width.

Thereby, the carving tool 30 and the disposable carving tool 40 are not adapted to cut or carve the workpiece more than 0.3 mm.

As shown in FIG. 7, the flat top face 321 of the carving blade 32 is located at the central line, and only one side of the carving blade 32 can cut workpiece, so the carving blade 32 vibrates greatly at high cutting speed. In other words, the carving tool 30 cannot cut the workpiece at high speed.

As illustrated in FIGS. 6 and 8, the carving blade 32 includes the eccentricity value e and only can cut the workpiece by its single side, i.e., the first side 322 and the cutting edge 324, thus reducing cutting capacity. Furthermore, after a period of using time, the carving blade 32 will be dull and broken, and due to a size of the carving blade 32 is small, the eccentricity value may be changed if the carving blade is sharpened imprecisely.

The disposable carving blade 40 is applied to carve the workpiece by replacing blades based on using requirement. However, this disposable carving blade 40 can only cut the workpiece less than 0.3 mm, when it is used to cut the workpiece more than 0.3 mm, the chips cannot be eliminated efficiently, and the disposable carving blade 40 is broken easily.

The present invention has arisen to mitigate and/or obviate the afore-described disadvantages.

SUMMARY OF THE INVENTION

The primary objective of the present invention is to provide a disposable multi-edge carving blade in which a distal end of the carving blade has at least two cutting rims, such as a first cutting rim and a second cutting rim so as to cut a workpiece simultaneously while feeding a tool, thus eliminating chips of the workpiece quickly, accelerating cutting speed, and decreasing working time and cost.

Secondary objective of the present invention is to provide a disposable multi-edge carving blade which is locked on a non-eccentric tool arbor so as to be applicable for chamfer tools or non-eccentric disposable carving tools of varying arbors, thus saving using cost.

Another objective of the present invention is to provide a disposable multi-edge carving blade in which the distal end of the carving blade has the at least two cutting rims for eliminating the chips of the workpiece quickly and accelerating working time efficiently.

To obtain the above objectives, a disposable multi-edge carving blade provided by the present invention contains: a first end and a second end which are symmetrical to each other and are connected together so as to form a V-shaped end portion of the carving blade, wherein the first end of the carving blade has a first side face defined thereon, and the second end of the carving blade has a second side face formed thereon, the carving blade also includes two chip removing grooves correspondingly arranged beside a distal end of the V-shaped end portion thereof, and each chip removing groove has a cutting face defined on a bottom end thereof and intersecting with a rotation axis of the carving blade so that at least two cutting edges are oppositely defined beside the rotation axis.

Preferably, the carving blade is fixed on a holding seat in a negative-angle state and inclines forward, and an added thickness of the carving blade makes two side thicknesses of the carving blade beside two sides of the rotation axis equal so as to increase a number of cutting edges on a distal end of the carving blade.

Preferably, an end point of the rotation axis is defined an angle tangent to the cutting faces of the carving blade, and an end surface of the carving blade has a predetermined width and is tangent to the cutting faces so as to form a first cutting rim and a second cutting rim.

DETAILED DESCRIPTION OF THE PREFERRED EMBODIMENTS

Figure 1:
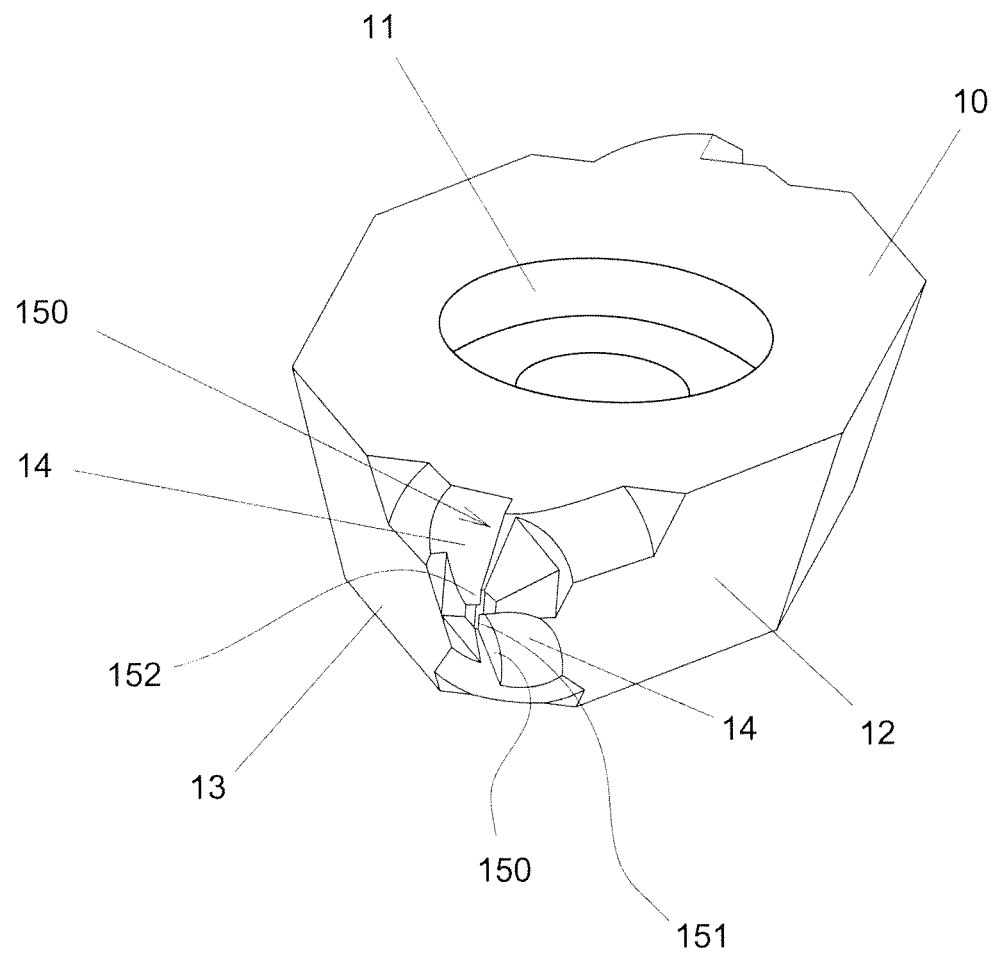
FIG. 1 is a perspective view showing the assembly of a disposable multi-edge carving blade according to a preferred embodiment of the present invention.
Figure 2:
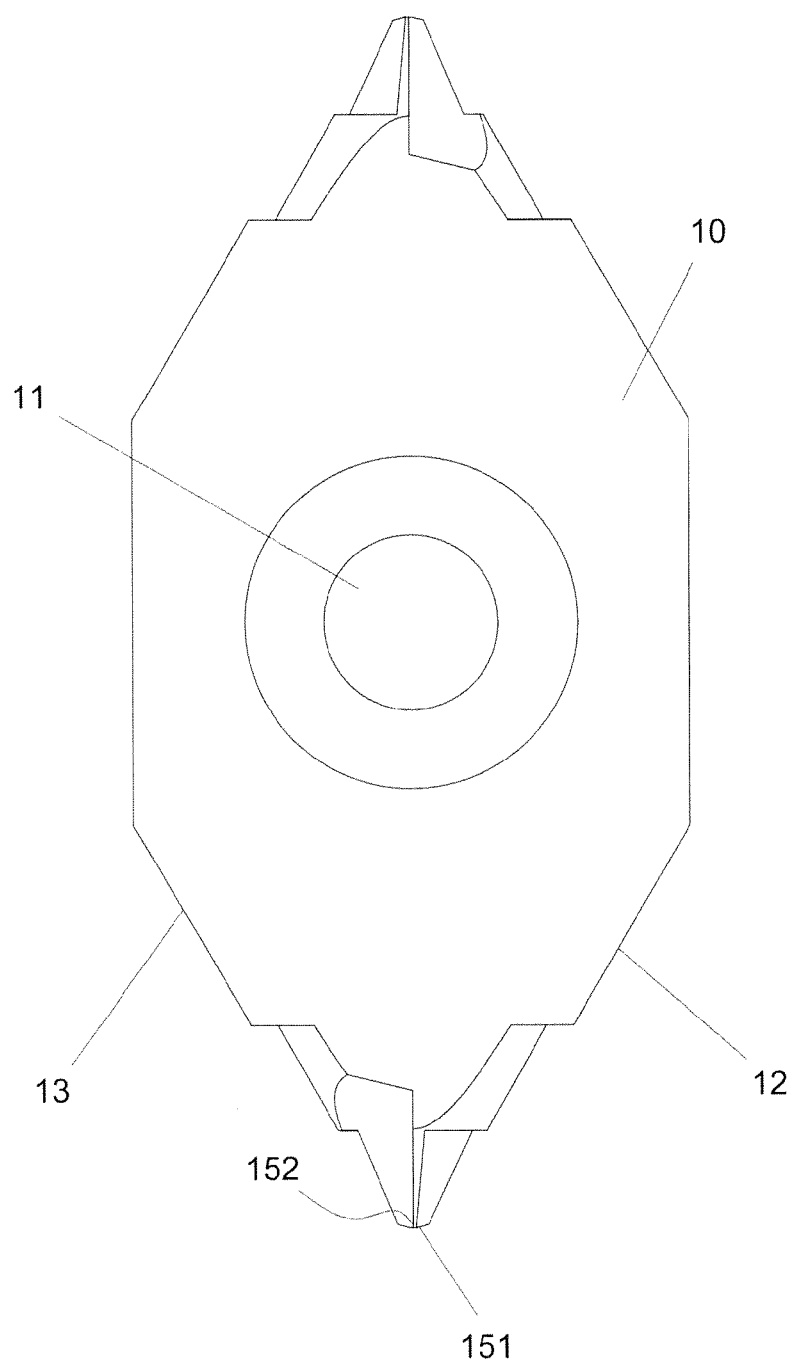
FIG. 2 is a top plan view showing the assembly of the disposable multi-edge carving blade according to the preferred embodiment of the present invention.

With reference to FIGS. 1-4, a disposable multi-edge carving blade 10 according to a preferred embodiment of the present invention comprises a central hole 11 defined at a central position thereof, a first end and a second end which are symmetrical to each other and are connected together so as to form a V-shaped end portion of the carving blade 10, wherein the first end of the carving blade 10 has a first side face 12 defined thereon, and the second end of the carving blade 10 has a second side face 13 formed thereon. The carving blade 10 also includes two chip removing grooves 14 correspondingly arranged beside a distal end of the V-shaped end portion thereof, and each chip removing groove 14 has a cutting face 150 defined on a bottom end thereof and intersecting with a rotation axis 100 of the carving blade 10 so that at least two cutting edges are oppositely defined beside the rotation axis 100, wherein the first side face 12 and the cutting face 150 on the first end forms a first cutting rim 151, and the second side face 13 and the cutting face 150 on the second end forms a second cutting rim 152, thus forming the at least two cutting edges on the carving blade 10.

Figure 5:
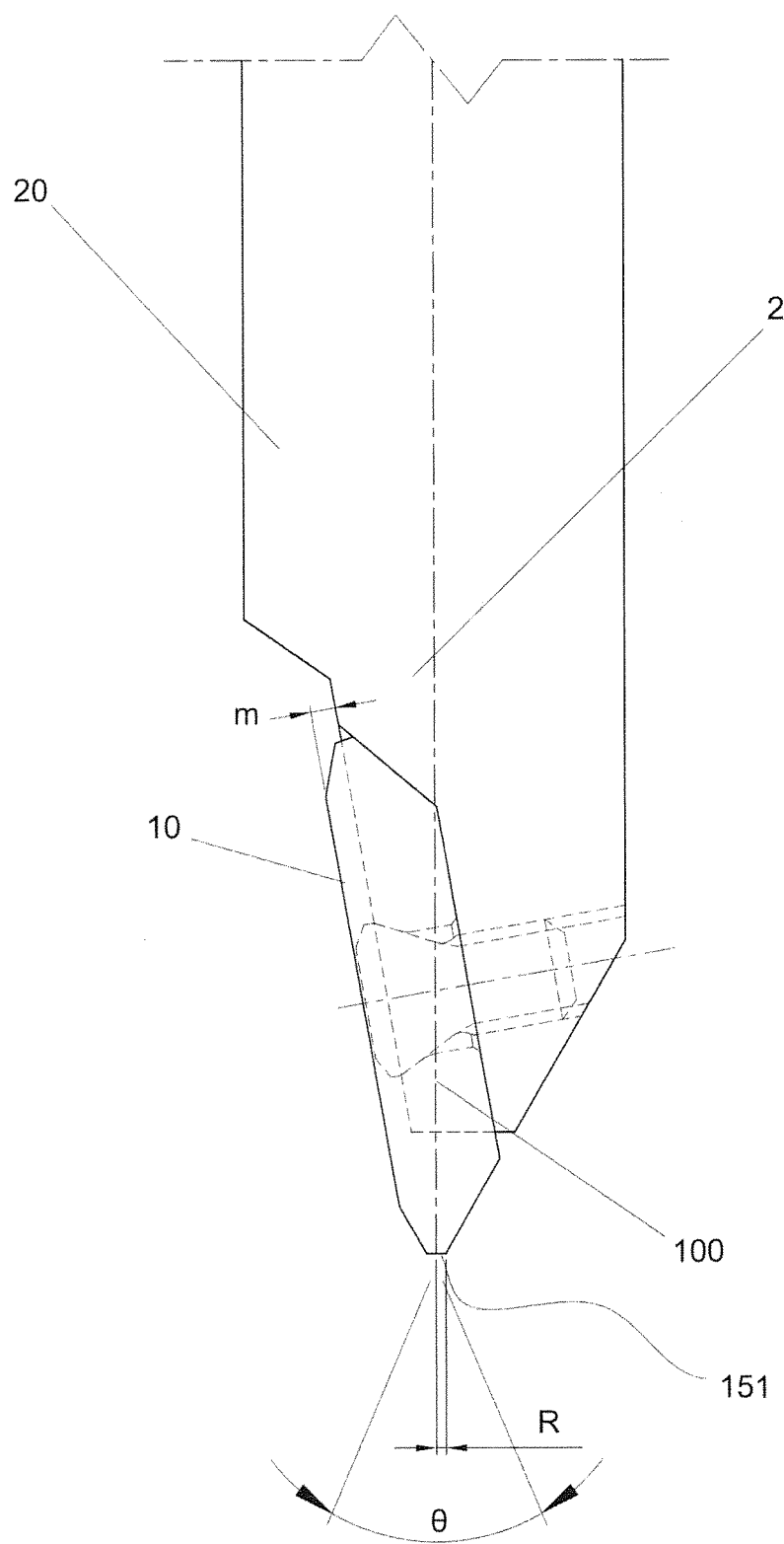
FIG. 5 also shows the disposable multi-edge carving blade being fixed on a tool according to the preferred embodiment of the present invention.
Figures 6, 7:
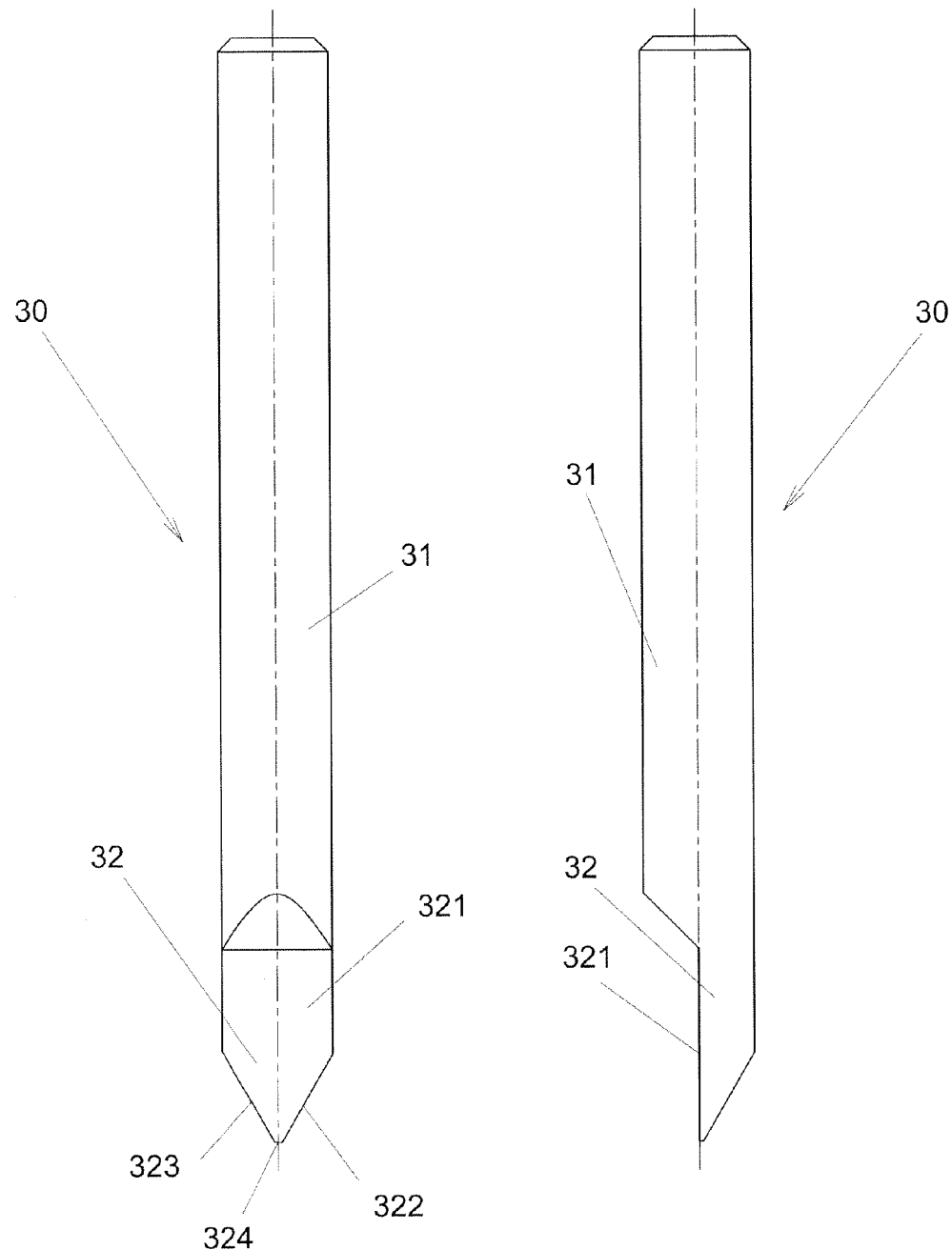
FIG. 6 is a plan view of a conventional carving tool.
FIG. 7 is another plan view of the conventional carving tool.
Figure 8:
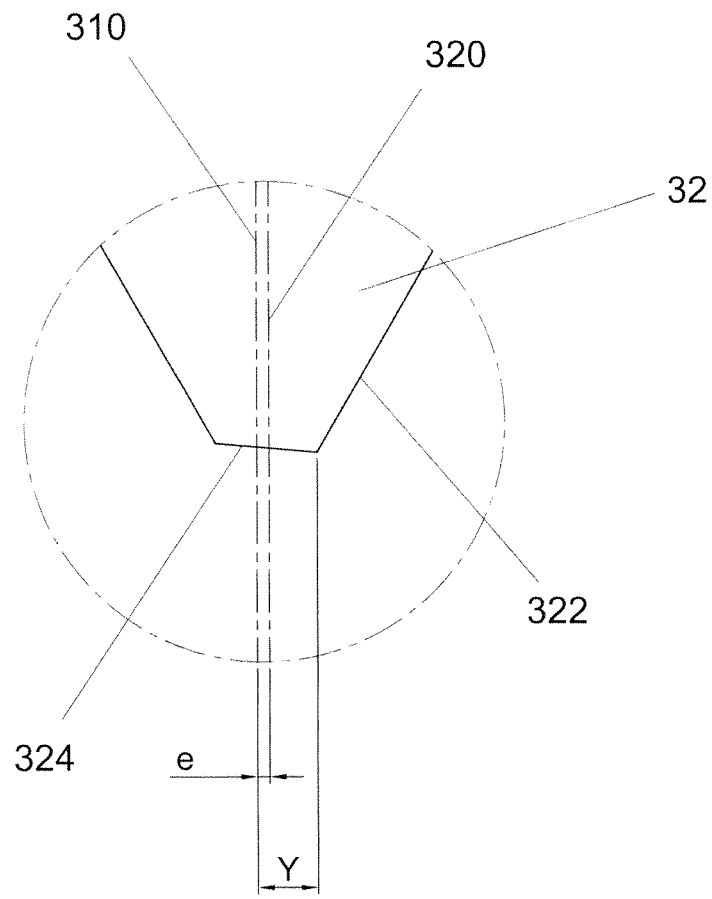
FIG. 8 is an amplified plan view of a part of a conventional carving tool.
Figure 9:
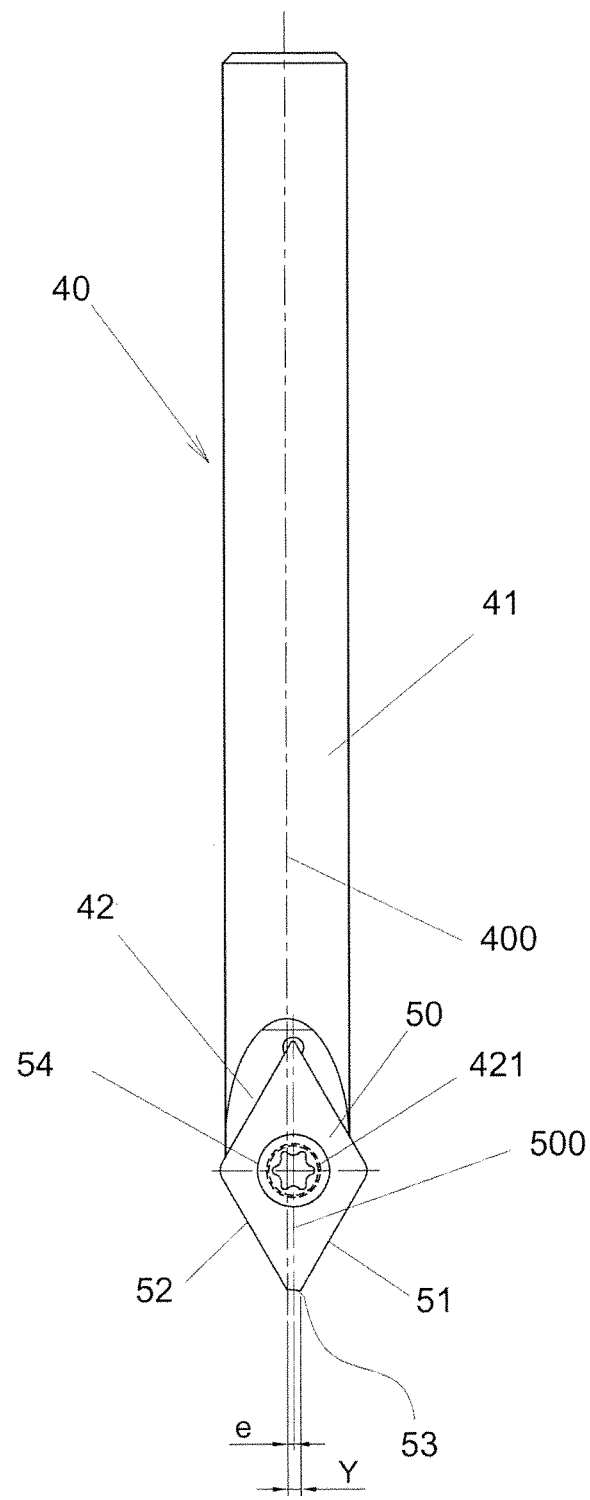
FIG. 9 is a plan view of a conventional disposable carving tool.

FIG. 5 is a side plan view showing the carving blade 10 being fixed on a tool 20 according to the preferred embodiment of the present invention. The carving blade 10 is fixed on a holding seat 21 in a negative-angle state and inclines forward. It is to be noted that an added thickness m of the carving blade 10 makes two side thicknesses of the carving blade 10 beside two sides of the rotation axis 100 equal so as to increase a number of cutting edges on a distal end of the carving blade 10, thereby obtaining the multi-edge carving blade 10.

Figure 3:
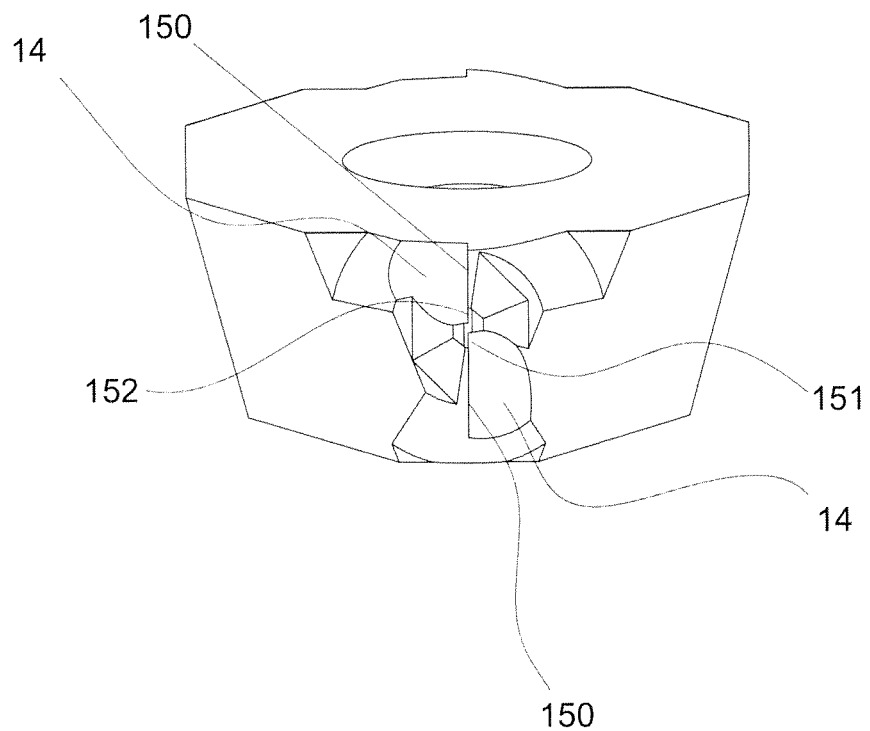
FIG. 3 is a front view showing the assembly of the disposable multi-edge carving blade according to the preferred embodiment of the present invention.
Figure 4:
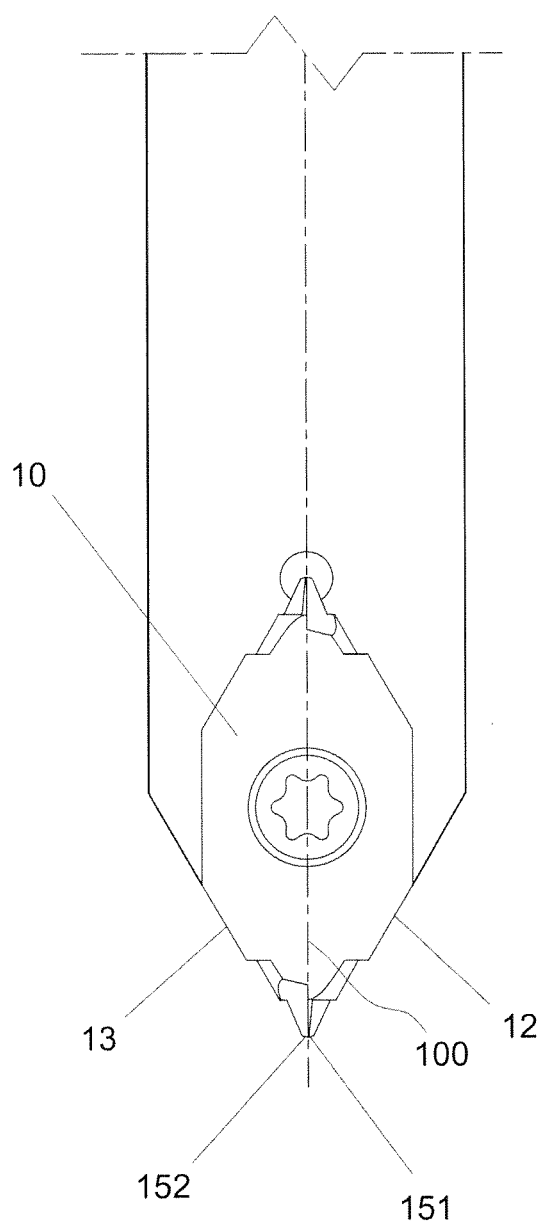
FIG. 4 shows the disposable multi-edge carving blade being fixed on a tool according to the preferred embodiment of the present invention.

Referring further to FIGS. 3 and 5, an end point of the rotation axis 100 is not located at a top surface of the carving blade 10, and the end point of the rotation axis 100 is defined an angle θ, such as 60 degrees. Furthermore, the end point of the rotation axis 100 is tangent to the cutting faces 150 of the carving blade 10, and an end surface of the carving blade 10 has a predetermined width and is tangent to the cutting faces 150 so as to form the first cutting rim 151 and the second cutting rim 152, wherein a width of the first cutting rim 151 is a radius R of engraving cutting, hence the first cutting rim 151 and the second cutting rim 152 are employed to cut workpiece, thereby obtaining the multi-edge carving blade 10.

As mentioned above, the distal end of the carving blade 10 has at least two cutting rims, such as the first cutting rim 151 and the second cutting rim 152 so as to cut the workpiece simultaneously while feeding the tool, thus eliminating chips of the workpiece quickly, doubling cutting speed, and decreasing working time and cost. The cutting speed is increased multiplicatively according to the number of the cutting edges. Preferably, the carving blade 10 is locked on a non-eccentric tool arbor so as to be applicable for chamfer tools or non-eccentric disposable carving tools of varying arbors, thus saving using cost.

In addition, the distal end of the carving blade 10 has the at least two cutting rims for eliminating the chips of the workpiece quickly and accelerating working time efficiently.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A disposable multi-edge carving blade comprising:
   a first end and a second end which are symmetrical to each other about an axis perpendicular to a longitudinal axis of the carving blade and are connected together so as to form a substantially V-shaped end portion of the carving blade, the first end of the carving blade having a first side face defined thereon, the second end of the carving blade having a second side face formed thereon, the carving blade including two chip removing grooves positioned at a distal end of the V-shaped end portion, and each chip removing groove having a cutting face defined on a bottom end thereof, the cutting faces of the chip removing grooves intersecting with a rotation axis of the carving blade to define at least two cutting edges on opposing sides of the rotation axis;
   wherein the carving blade is fixed on a holding seat in a negative-angle state to incline in a forward direction, the two cutting edges of the carving blade being opposed with respect to the rotation axis to extend in forward and rearward directions therefrom.

2. The disposable multi-edge carving blade as claimed in claim 1, wherein an end point of the rotation axis is defined an angle tangent to the cutting faces of the carving blade, and an end surface of the carving blade has a predetermined width and is tangent to the cutting faces so as to form a first cutting rim and a second cutting rim.

3. A disposable multi-edge carving blade comprising:
   a first end and a second end which are symmetrical to each other about an axis perpendicular to a longitudinal axis of the carving blade and are connected together so as to form a substantially V-shaped end portion of the carving blade, the first end of the carving blade having a first side face defined thereon, the second end of the carving blade having a second side face formed thereon, the carving blade including two chip removing grooves correspondingly arranged beside a distal end of the V-shaped end portion, and each chip removing groove having a cutting face defined on a bottom end thereof, the cutting faces of the chip removing grooves intersecting with a rotation axis of the carving blade to define at least two cutting edges on opposing sides of the rotation axis;
   wherein an end point of the rotation axis is defined an angle tangent to the cutting faces of the carving blade, and an end surface of the carving blade has a predetermined width and is tangent to the cutting faces so as to form a first cutting rim and a second cutting rim.

* * * * *